(12) United States Patent
Snelling

(10) Patent No.: US 6,569,787 B1
(45) Date of Patent: May 27, 2003

(54) LAMINATED GLAZINGS

(75) Inventor: James Peter Snelling, Coventry (GB)

(73) Assignee: Pilkington Aerospace Limited, Birmingham (GB)

( * ) Notice: Subject to any disclaimer, the term of this patent is extended or adjusted under 35 U.S.C. 154(b) by 0 days.

(21) Appl. No.: 09/517,752

(22) Filed: Mar. 3, 2000

(30) Foreign Application Priority Data

Mar. 11, 1999 (GB) .............................................. 9905467
Nov. 20, 1999 (GB) .............................................. 9927390

(51) Int. Cl.[7] ........................ B32B 27/04; B32B 27/12; B32B 5/02; B32B 23/02; B29D 22/00
(52) U.S. Cl. ...................... 442/135; 442/134; 442/149; 442/150; 442/151; 428/36.1; 428/36.4; 428/192; 428/911; 2/2.5
(58) Field of Search ............................. 2/2.5; 428/911, 428/36.1, 36.4, 192; 442/134, 135, 149, 150, 151

(56) References Cited

U.S. PATENT DOCUMENTS

| | | | | |
|---|---|---|---|---|
| 4,277,294 A | | 7/1981 | Orcutt | ......................... 156/102 |
| 4,773,653 A | * | 9/1988 | Unverzagt | .................. 273/404 |
| 5,373,672 A | | 12/1994 | Schulz | ......................... 52/235 |

FOREIGN PATENT DOCUMENTS

| | | | | |
|---|---|---|---|---|
| DE | 4006709 | | 9/1991 | |
| DE | 4142416 | * | 6/1993 | ................ 428/911 |
| DE | 19745248 | | 4/1999 | |
| DE | 29818858 | | 4/1999 | |
| EP | 915315 | | 5/1999 | |
| FR | 2764841 | | 12/1998 | |
| FR | WO 01/000403 A1 | * | 1/2001 | .......... B32B/17/10 |
| GB | 533668 | | 2/1941 | |
| GB | 970637 | | 11/1962 | |
| WO | 98/57805 | | 12/1998 | |
| WO | 99/39152 | | 8/1999 | |

* cited by examiner

Primary Examiner—Elizabeth M. Cole
Assistant Examiner—Jeremy R Pierce
(74) Attorney, Agent, or Firm—Burns, Doane, Swecker & Mathis, L.L.P.

(57) ABSTRACT

A laminated bullet resistant glazing comprises a plurality of glass and plastic plies arranged in at least two layers including an outer layer and an inner layer. The outer layer extends beyond the inner layer so as to form a step which extends around at least part of the periphery of the glazing. The glazing is reinforced with a band positioned at least partially on the step and having at least first and second longitudinal faces, and in position the first longitudinal face is in contact with the step and the second longitudinal face is in contact with an adjacent portion of the glazing. Application of the band to the step enhances the support strength of the outer layer and enables the manufacture of a bullet resistant glazing having an outer layer reduced in thickness compared to prior bullet resistant glazings.

28 Claims, 3 Drawing Sheets

LAMINATED GLAZINGS

BACKGROUND OF THE INVENTION

1. Field of the Invention

This invention relates to laminated glazings and in particular to bullet resistant glazings.

2. Summary of Related Art

Bullet resistant glazings comprise a laminated structure that includes multiple glass plies and at least one impact resistant ply. These glazings may be installed in vehicles and to facilitate installation the glazing may be provided with a step adjacent its periphery, the step extending around part or all of the periphery. The step results from one or more of the plies extending beyond the remaining plies, and in this specification the ply or plies which thus extend beyond the others will be referred to as the "outer layer". The outer layer normally has a greater peripheral dimension than the remaining plies and is usually a single glass ply, which may be annealed, semi-toughened or toughened, but it may also comprise a laminate such as two glass plies bonded by a suitable plastics layer or layers. The "step" of the outer layer enables the glazing to be fitted into the glazing channels of vehicle openings. However, the outer layer must be thick enough in order to possess the structural strength to support the weight of the glazing when fitted into the vehicle opening and to resist dynamic loadings that occur when the vehicle is in motion or the step is likely to be damaged, which may result in the body of the glazing breaking away from the step and falling out of the vehicle opening. Furthermore, the application of a conventional ceramic obscuration band around the periphery of the glazing (which will inevitably cover at least part of the step) weakens the glass covered by the obscuration band thereby reducing the structural strength in the stepped region.

Bullet resistant glazings used in vehicles may have a thickness up to 70 mm or more and a consequence the outer layer may be up to 9 mm thick or more. In some specialist vehicles (e.g. military vehicles) where ballistic protection is required, the thickness of the glazing channels may be set during manufacture of the vehicles at the required thickness to accommodate the bullet resistant glazing. However, there are instances where bullet resistant glazings are installed into mass-produced vehicles and it is not practical to change the tooling used in the manufacture of the vehicle bodywork to alter the width of the glazing channels from conventional thicknesses to greater thicknesses so as to accommodate bullet resistant glazings. As a consequence these vehicles are individually adapted to accommodate the bullet resistant glazings and this may be very expensive.

It would be desirable to provide a bullet resistant glazing suitable for installation in glazing channels of conventional thicknesses.

SUMMARY OF THE INVENTION

According to the invention there is provided a laminated bullet resistant glazing comprising a plurality of glass and plastics plies arranged in at least two layers including an outer layer and an inner layer, wherein the outer layer extends beyond the inner layer so as to form a step which extends around at least part of the periphery of the glazing, and wherein the glazing is reinforced with a band at least partially positioned on the step, the band having at least first and second longitudinal faces wherein the first longitudinal face is in contact with the step and the second longitudinal face is in contact with an adjacent portion of the glazing.

The band enhances the support strength of the outer layer of the glazing and enables the manufacture of a bullet resistant glazing with the outer layer being reduced in thickness. Such a glazing may be accommodated in conventional automotive glazing systems of mass produced vehicles which have standard glazing channels which are less than about 6 mm thick.

The band is preferably comprised of a ballistic resistant material which additionally provides ballistic protection around the stepped region of the glazing which traditionally has been ballistically weak, and reduces or prevents spall, which results from breakage of the step, entering the interior of the vehicle.

The band may be comprised of metal or alternatively from a fibre reinforced material. Preferably the fibre is an aramid fibre.

The band may be of angled construction, i.e. comprising two strips which meet at an angle. The strips may be joined at right angles with a longitudinal face of the first strip mounted on the step and a longitudinal face of the second strip mounted on the periphery of the adjacent plies. This arrangement further enhances the support strength of the outer layer.

At least part of the band may be embedded in an interlayer which bonds the outer layer to the inner layer. Such an arrangement further enhances the support strength of the outer layer.

The embedded part of the band may have a thickness in cross-section less than that of the remainder of the band. Such a band may be accommodated between the outer and inner layers of the glazing without having to alter the thickness of the plastic ply or plies (or interlayer) which bonds these layers.

Preferably the face of the band mounted on the step is co-extensive therewith.

An adhesive may bond the band to the glazing and preferably the adhesive is polyurethane.

The thickness of the band may be in the range 2 to 16 mm and is preferably in the range 2 to 4 mm. The combined thickness of the step and the band may be in the range 5 to 30 mm.

DESCRIPTION OF THE DRAWINGS

Embodiments of the invention will now be described with reference to the accompanying drawings in which.

DESCRIPTION OF THE PREFERRED EMBODIMENTS

Figure 1:
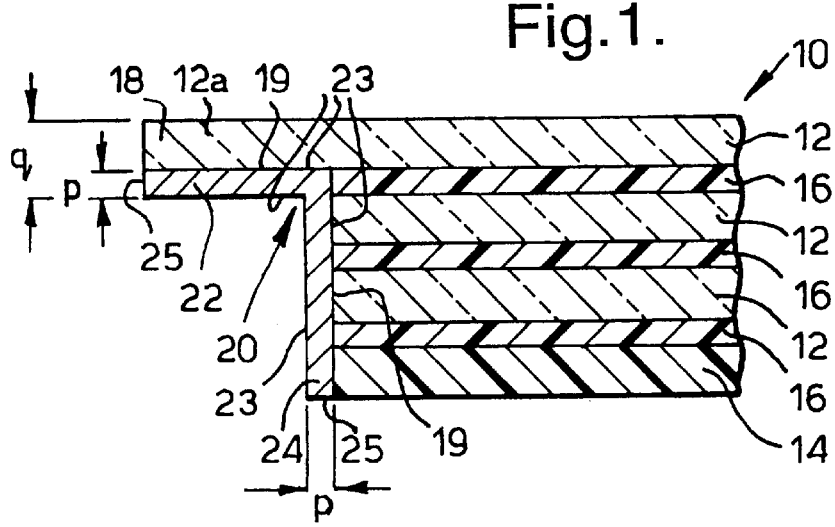
FIG. 1 is a fragmentary cross section of a laminated glazing in accordance with a first embodiment of the invention.

Referring to the drawings a laminated glazing generally designated 10 comprises glass plies 12 and an impact resistant ply 14, such as polycarbonate, bonded by flexible plastics interlayers 16 such as polyvinylbutyral or polyurethane. The outer glass ply 12a of the glazing has a step 18 which is formed around at least part of the periphery of the glazing. In fixed windows, such as a windscreen or a backlight, the step may extend around the whole periphery of the window, and in opening windows the step may or may not extend around the edge of the window that can be exposed.

The glazing 10 further comprises a reinforcing band 20, which is coextensive with the step 18. In FIG. 1 the reinforcing band comprises strips 22 and 24 having longitudinal faces 23 and end faces 25. Strips 22 and 24 are joined at right angles such that in use a longitudinal face of first strip 22 is mounted on the step and a longitudinal face of second strip 24 is mounted on the periphery of the inner plies of the glazing. The band may be adhered to the glazing by applying a suitable adhesive 19, such as sheet polyurethane, between the band and the glazing and bonding may occur during the autoclave cycle used to laminate the plies of the glazing.

Figure 2:
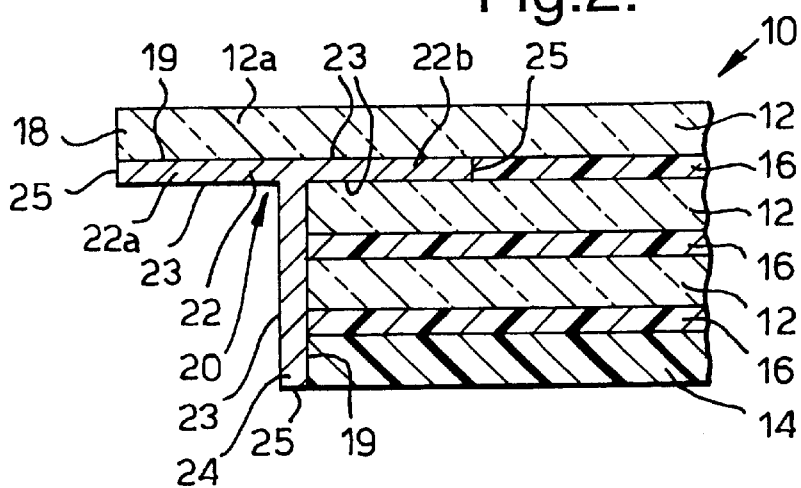
FIG. 2 is a fragmentary cross section of a laminated glazing in accordance with a second embodiment of the invention.

In FIG. 2 a different design of reinforcing band is shown which is of T shaped cross section and comprises a first strip 22 having ends 22a and 22b, and a second strip 24 joined at right angles to the first strip 22. The end 22b of first strip 22 is embedded in the interlayer which bonds the outer glass ply 12a to its adjacent glass ply. With end 22b of the band embedded in the interlayer, the band is somewhat fixed in position and may be further fixed in position by applying an adhesive 19 between the band and the glazing as hereinbefore described.

Figure 3:
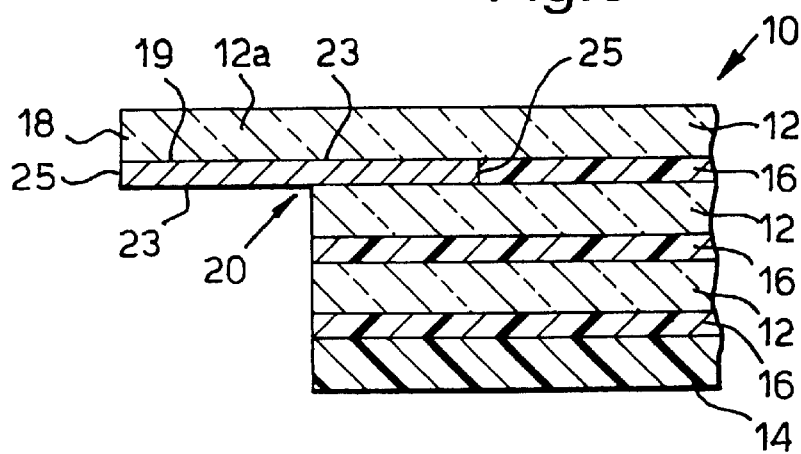
FIG. 3 is a fragmentary cross section of a laminated glazing in accordance with a third embodiment of the invention.

A further alternative form of design of reinforcing band 20 is shown in FIG. 3 which is substantially planar and partly embedded in the interlayer which bonds the outer glass ply 12a to its adjacent glass ply. An adhesive 19 may be applied between the band 20 and the step 18 to adhere the band to the glazing as hereinbefore described.

Figure 4:
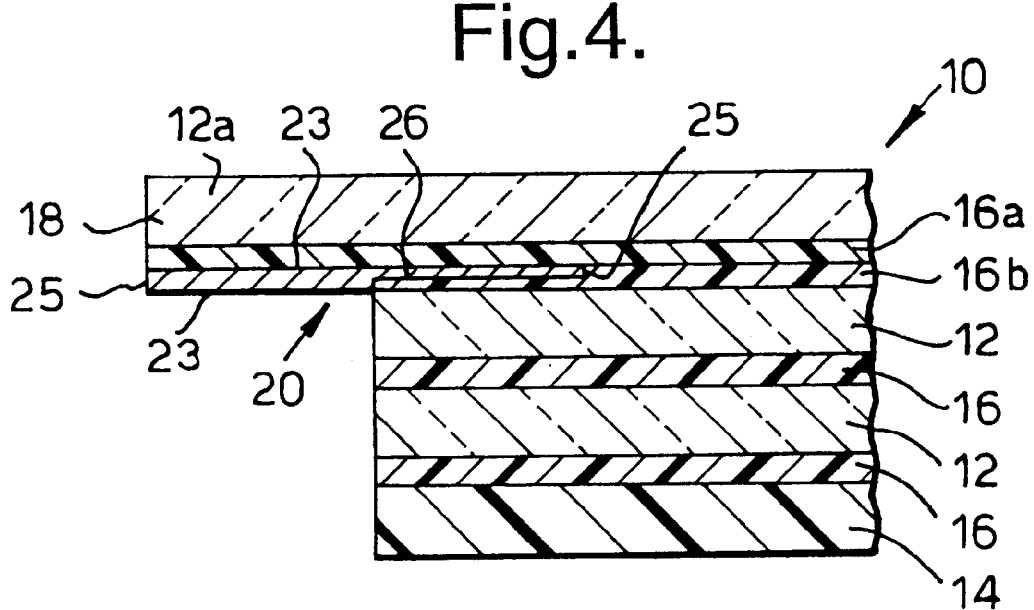
FIG. 4 is a fragmentary cross section of a laminated glazing in accordance with a fourth embodiment of the invention.

FIG. 4 shows a still further design of reinforcing band 20 in which the band is provided with a stepped region 26 (i.e. a region thinner in cross section than the remainder of the band) which is embedded in the interlayer 16 which bonds the outer glass ply 12a to its adjacent glass ply. Preferably the interlayer comprises more than one layer and in FIG. 4 it comprises a polyurethane layer 16a and polyvinylbutyral layer 16b. The stepped region 26 of the band 20 is sufficiently thin enough that it can be accommodated between layers 16a and 16b without the need for altering the thickness of any of the layers of the multi-layer interlayer. This arrangement allows band 20 and interlayer 16 to overlap thereby enhancing the strength of this part of the glazing.

The thickness of a reinforcing band used in the present invention, shown as dimension p in FIG. 1, may be in the range 2 to 16 mm and is preferably in the range 2 to 4 mm, and the thickness of the stepped region in a glazing according to the present invention, shown as dimension q in FIG. 1, may be in the range 5 to 30 mm and is preferably in the range 5 to 16 mm. The thickness of the stepped region 26 of the band 20 may be as low as 0.4 mm or less.

Figure 5A:
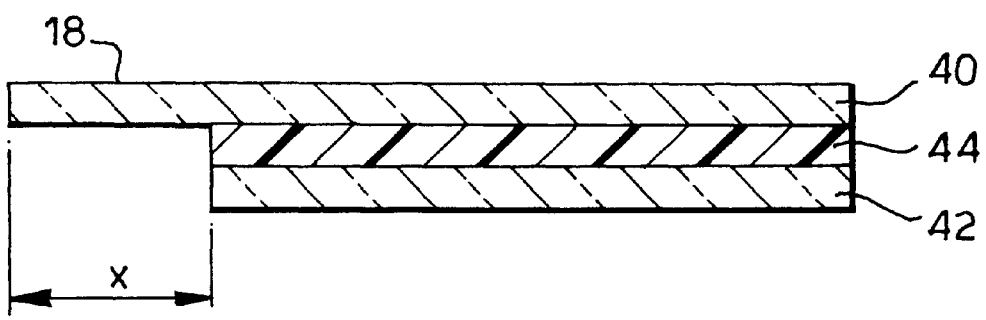
FIGS. 5A to 5C are cross sections of stepped glazing samples tested to assess the structural strength in their stepped region.
Figure 5B:
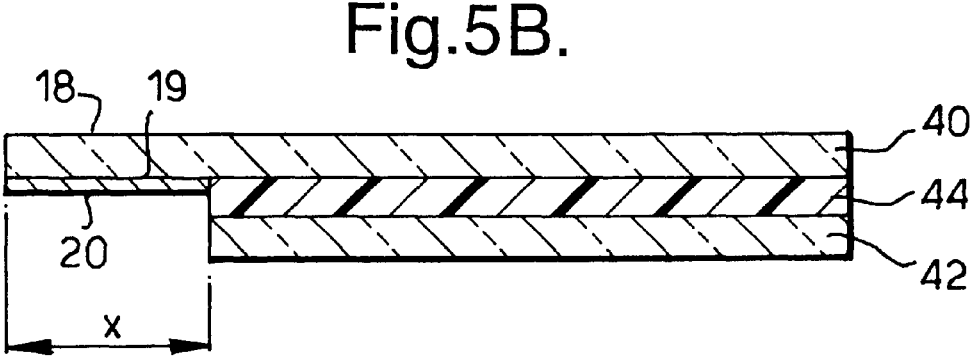
Figure 5C:
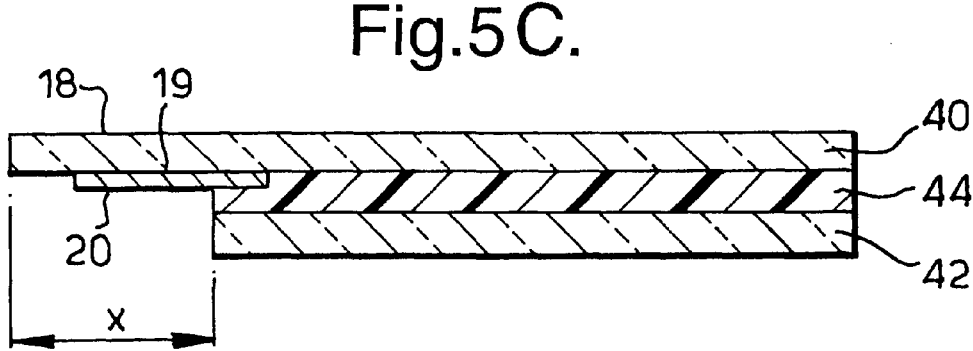

In order to demonstrate that the application of a reinforcing band around the step increases the structural strength in the stepped region, a number of representative samples were constructed for testing as shown in FIG. 5. Samples A, B, C1 and C2 (shown in FIGS. 5A, 5B and 5C respectively) each comprise an outer soda lime annealed glass ply 40 which is 500 mm in length, 50 mm wide and 6 mm thick, and an inner glass ply 42 which is 380 mm in length, 50 mm wide and 6 mm thick bonded by a 5 mm thick PVB interlayer 44. The step 18 in each sample was therefore 120 mm in length (shown as dimension x) and 50 mm wide. In Sample B a reinforcing material 20 comprising a metal plate of dimensions 120 mm×50 mm and 2.5 mm thick was bonded to the step by 1.25 mm thick sheet polyurethane 19 and laminated during the autoclave cycle used to laminate the glass plies. In Sample C1 a similar sized plate was similarly bonded to the step but arranged so as to be embedded 20 mm into the PVB interlayer 44. The metal plate 20 in Samples B and C1 comprised 13% manganese steel plate having a tensile strength of 800–1130 N mm$^{-1}$, and is available from Sleeman Engineering FRC Ltd of Wednesbury, England. Sample C2 was constructed similar to that of Sample C1 except that the reinforcing material 20 comprised a multilayer neoprene binded aramid fibre of 3 mm thickness available from Verseiding Indutex of Stalybridge, Cheshire, England and was bonded to the step by 0.38 mm sheet polyurethane. In this particular sample the aramid fibre was Kevlar (trade mark) which was weaved into a mat and impregnated with a neoprene binder. Each sample was allowed to temperature stabilise at 18° C. for 24 hours before testing.

Figure 6:
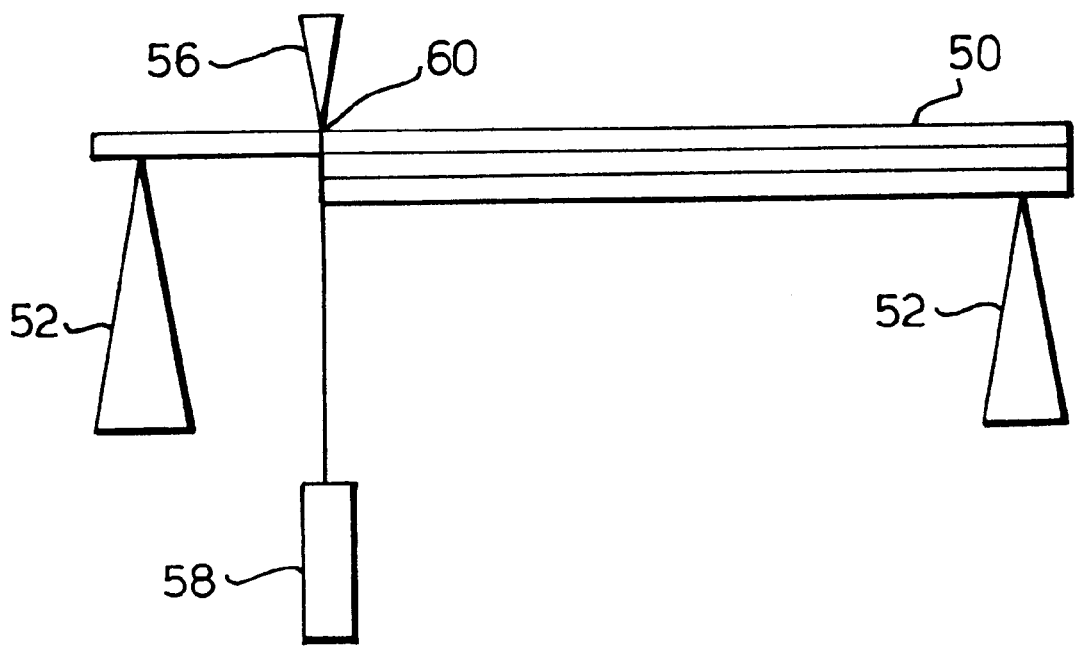
FIG. 6 is a schematic cross section of a stepped glazing sample and test apparatus used to assess the structural strength of the sample's stepped region.

In turn each sample 50 (A, B, C1 and C2) was tested on an arrangement as shown in FIG. 6. Each sample was placed on two knife edge supports, 52, each being 10 mm inboard from the sample edges. A knife edge load applicator 56 and an associated weight tray 58 was arranged at load point 60 and weights were increasingly added to the weight tray until the step broke from the body of the sample. Breakage occurred for Sample A at 22 kg, for Sample B at 28 kg, for Sample C1 at 48 kg and for Sample C2 at 24 kg. It was also noted that in Sample A the step broke away completely from the body of the sample, whilst in Samples B, C1 and C2 although the glass step broke, the reinforcing material 20 retained attachment to the body of the sample.

From these results it is clear that the application of a reinforcing band to the step significantly increases the structural strength in this area and enables the manufacture of a bullet resistant glazing having an outer layer reduced in thickness compared to prior bullet resistant glazings. Furthermore, as the reinforcing material remained attached to the body of the sample once the step had broken, a glazing having a band mounted on the step in a similar fashion to that described with reference to the Samples, will be retained in the vehicle opening after the step has broken or been fractured.

The band is preferably comprised of a ballistic resistant material which additionally provides ballistic protection around the stepped region of the glazing which traditionally has been ballistically weak, and reduces or prevents spall, which results from breakage of the step, entering the interior of the vehicle.

It will be appreciated that other fibre reinforced materials in addition to aramid fibre reinforced materials may also be suitable materials from which the band 20 may be formed, for example polyethylene fibres mixed with an elastomeric binder (such as neoprene or polyurethane) and examples of such materials are Dyneema (trade mark) available from DSM High Performance Films of Holland and Spectra (trade mark) available from Allied Signal Corporation of USA.

A particular advantage of using a reinforcing band which comprises a multilayer fibre impregnated with a binder is in its ease of processing in the manufacture of laminated glazings, and in particular those which are curved. Such a band may be appropriately positioned in the lay up to be laminated and does not require to be bent (to conform to the curvature of the laminated glazing) prior to lamination. Preferably the multilayer material is impregnated with a polyurethane binder and such a material (which comprises an aramid fibre impregnated with a polyurethane binder) is available from Verseiding Indutex of Stalybridge, Cheshire, England and bonding occurs during the autoclave cycle used to laminate the plies of the glazing. Additionally, in the embodiment of FIG. 4 the stepped region 26 of the band 20 may be formed by at least one layer of the multilayer stack extending beyond the remaining layers.

It will be appreciated that known technical features may be incorporated into the glazing. For example a layer resistant to scratching and abrasion may be applied to the inner face of the impact resistant ply to enhance its surface durability. Furthermore, the glazing may be substantially flat or curved and it may contain at least one ply with solar control properties.

What is claimed is:

1. A laminated bullet resistant glazing comprising a plurality of glass and plastics plies arranged in at least two layers including an outer layer and an inner layer, wherein the outer layer extends beyond the inner layer so as to form a step, and wherein the glazing is reinforced with a band at least partially positioned on the step, the band being comprised of first and second strips transversely arranged relative to one another and each having oppositely facing first and second longitudinal faces, wherein the first longitudinal faces of the first and second strips form an interior angle of the band, the second longitudinal face of the first strip being in contact with the step and the second longitudinal face of the second strip being in contact with an adjacent portion of the glazing.

2. A glazing as claimed in claim 1 wherein the band is comprised of a ballistic resistant material.

3. A glazing as claimed in claim 1 wherein the band is comprised of metal.

4. A glazing as claimed in claim 1 wherein the band is comprised of a fibre reinforced material.

5. A glazing as claimed in claim 4 wherein the fibre is an aramid fibre.

6. A glazing as claimed in claim 1 wherein the first and second strips meet at right angles.

7. A glazing as claimed in claim 1 wherein at least part of the band is embedded in an interlayer which bonds the outer layer to the inner layer.

8. A glazing as claimed in claim 1 wherein the second longitudinal face of the strip that is in contact with the step is coextensive with the step.

9. A glazing as claimed in claim 1 wherein an adhesive bonds the band to the glazing.

10. A glazing as claimed in claim 9 wherein the adhesive is polyurethane.

11. A glazing as claimed in claim 1 wherein the thickness of the band is in the range of 2 to 16 mm.

12. A glazing as claimed in claim 11 wherein the thickness of the band is in the range 2 to 4 mm.

13. A glazing as claimed in claim 9 wherein the combined thickness of the step and the band is in the range 5 to 30 mm.

14. A glazing as claimed in claim 1 wherein the band in T-shaped in cross-section.

15. A laminated bullet resistant glazing comprising a plurality of glass and plastic plies arranged in at least two layers including an outer layer and an inner layer, wherein the outer layer extends beyond the inner layer so as to form a step, and wherein the glazing is reinforced with a band at least partially positioned on the step, the band having at least first and second oppositely facing longitudinal faces that are parallel to one another, wherein the first longitudinal face is in contact with the step and the second longitudinal face is in contact with an adjacent portion of the glazing.

16. A glazing as claimed in claim 15 wherein the thickness in cross section of the embedded part of the band is less than that of the remainder of the band.

17. A glazing as claimed in claim 15 wherein at least part of the band is embedded in an interlayer which bonds the outer layer to the inner layer.

18. A glazing as claimed in claim 15 wherein the band is comprised of a ballistic resistant material.

19. A glazing as claimed in claim 15 wherein the band is comprised of metal.

20. A glazing as claimed in claim 15 wherein the band is comprised of a fibre reinforced material.

21. A glazing as claimed in claim 20 wherein the fibre is an aramid fibre.

22. A glazing as claimed in claim 15 wherein an adhesive bonds the band to the glazing.

23. A glazing as claimed in claim 22 wherein the adhesive is polyurethane.

24. A glazing as claimed in claim 15 wherein the thickness of the band is in the range 2 to 16 mm.

25. A glazing as claimed in claim 15 wherein the thickness of the band is in the range of 2 to 4 mm.

26. A glazing as claimed in claim 15 wherein the combined thickness of the step and the band is in the range 5 to 30 mm.

27. A glazing as claimed in claim 15 wherein the first longitudinal face of the band that is in contact with the step is coextensive with the step.

28. A glazing as claimed in claim 15 wherein the band in T-shaped in cross-section.

* * * * *

UNITED STATES PATENT AND TRADEMARK OFFICE
CERTIFICATE OF CORRECTION

PATENT NO. : 6,569,787 B1
DATED : May 27, 2003
INVENTOR(S) : James Peter Sneling It is certified that error appears in the above-identified patent and that said Letters Patent is hereby corrected as shown below:

<u>Column 6,</u>
Line 7, change "in" to -- is --, so that the claim reads as follows:
14. A glazing as claimed in claim 1 wherein the band is T-shaped in cross-section.
Line 49, change "in" to -- is --, so that the claim reads as follows:
28. A glazing as claimed in claim 15 wherein the band is T-shaped in cross-section.

Signed and Sealed this

Twenty-eighth Day of October, 2003

JAMES E. ROGAN
*Director of the United States Patent and Trademark Office*